(12) United States Patent
Schwedt et al.

(10) Patent No.: US 10,203,490 B2
(45) Date of Patent: Feb. 12, 2019

(54) FUNCTIONALLY INTEGRATED LASER SCANNING MICROSCOPE

(71) Applicants: Carl Zeiss Microscopy GmbH, Jena (DE); Carl Zeiss AG, Oberkochen (DE)

(72) Inventors: Daniel Schwedt, Weimar (DE); Matthias Wald, Jena (DE); Tiemo Anhut, Jena (DE)

(73) Assignees: Carl Zeiss Microscopy GmbH, Jena (DE); Carl Zeiss AG, Oberkochen (DE)

( * ) Notice: Subject to any disclaimer, the term of this patent is extended or adjusted under 35 U.S.C. 154(b) by 147 days.

(21) Appl. No.: 15/314,063

(22) PCT Filed: May 22, 2015

(86) PCT No.: PCT/EP2015/061378
§ 371 (c)(1),
(2) Date: Nov. 25, 2016

(87) PCT Pub. No.: WO2015/181068
PCT Pub. Date: Dec. 3, 2015

(65) Prior Publication Data
US 2017/0199362 A1  Jul. 13, 2017

(30) Foreign Application Priority Data

May 28, 2014  (DE) .................. 10 2014 107 606

(51) Int. Cl.
*H04N 7/18* (2006.01)
*G02B 21/00* (2006.01)
(52) U.S. Cl.
CPC ....... *G02B 21/0032* (2013.01); *G02B 21/002* (2013.01); *G02B 21/004* (2013.01);
(Continued)

(58) Field of Classification Search
CPC ............ G02B 21/0032; G02B 21/0052; G02B 21/008; G02B 21/002; G02B 21/0076
(Continued)

(56) References Cited

U.S. PATENT DOCUMENTS

| 2003/0019931 A1* | 1/2003 | Tsikos .................... G02B 26/10 235/454 |
| 2007/0041090 A1 | 2/2007 | Gräfe et al. |

(Continued)

FOREIGN PATENT DOCUMENTS

| DE | 10 2008 054 317 A1 | 5/2010 |
| DE | 10 2009 060 490 A1 | 6/2011 |

(Continued)

OTHER PUBLICATIONS

International Search Report for corresponding International Application No. PCT/EP2015/061378 dated Aug. 6, 2015; 4 pages.
(Continued)

*Primary Examiner* — Robert Chevalier
(74) *Attorney, Agent, or Firm* — Patterson Thuente Pedersen, P.A.

(57) ABSTRACT

A functionally integrated laser scanning microscope for scanning a sample with laser illumination, selectably in a confocal, line or wide-field operating mode, comprising a laser light source, an illumination and detection beam path, a detection device and at least one objective, wherein the illumination and detection beam path has optical means for the configuration of the laser illumination, at least one scanner for scanning the sample with the laser illumination, and a beam splitter for separating illumination and detection light, and controllable optical elements for changing the beam guiding depending on the operating mode selected in each case.

10 Claims, 6 Drawing Sheets

(52) U.S. Cl.
CPC ....... *G02B 21/008* (2013.01); *G02B 21/0052* (2013.01); *G02B 21/0076* (2013.01)

(58) Field of Classification Search
USPC ................ 348/80, 77, 79, 61, 63, 64, 67, 68
See application file for complete search history.

(56) References Cited

U.S. PATENT DOCUMENTS

| | | |
|---|---|---|
| 2008/0156999 A1 | 7/2008 | Nishiwaki et al. |
| 2008/0239475 A1 | 10/2008 | Hirukawa et al. |
| 2011/0284767 A1 | 11/2011 | Wolleschensky et al. |
| 2013/0135717 A1 | 5/2013 | Schulz |
| 2013/0155218 A1 | 6/2013 | Kalkbrenner et al. |
| 2014/0184777 A1 | 7/2014 | Kleppe et al. |

FOREIGN PATENT DOCUMENTS

| | | | |
|---|---|---|---|
| DE | 10 2011 077 269 A1 | 12/2012 | |
| EP | 2 317 363 A2 | 5/2011 | |
| EP | 2597506 A1 | 5/2013 | |
| JP | 2007-506146 A | 3/2007 | |
| JP | 2008-249965 A | 10/2008 | |

OTHER PUBLICATIONS

English translation of International Search Report for corresponding International Application No. PCT/EP2015/061378 dated Aug. 6, 2015; 3 pages.

Written Opinion for corresponding International Application No. PCT/EP2015/061378 dated Aug. 6, 2015; 8 pages.

Search Report for corresponding German Application No. 10 2014 107 606.0 dated Jul. 31, 2014; 10 pages.

International Preliminary Report on Patentability for corresponding International Application No. PCT/EP2015/061378 dated Dec. 8, 2016; 12 pages.

Office Action for Japanese Application No. 2016-569612, dated Jun. 5, 2018 (4 pgs) and English Machine Translation (4 pgs).

* cited by examiner

FUNCTIONALLY INTEGRATED LASER SCANNING MICROSCOPE

RELATED APPLICATIONS

The present application is a National Phase entry of PCT Application No. PCT/EP2015/061378, filed May 22, 2015, which claims priority from DE Patent Application No. 10 2014 107 606.0, filed May 28, 2014, both of said applications being hereby incorporated by reference herein in their entirety.

FIELD OF THE INVENTION

The invention relates to a functionally integrated laser scanning microscope, designed for scanning a sample with laser illumination, selectably in a confocal, line or wide-field operating mode.

STATE OF THE ART

Confocal laser scanning microscopes are known per se. Here a sample area to be examined is scanned with a laser beam focused on a point; for all the locations scanned, the properties of the light reflected by the sample substance or emitted by fluorescence are measured by means of image sensors, and an image of the sample area is produced from the measurement results.

With the use of laser scanning microscopy in biomedical research in recent years, live cell research has been attracting more and more scientific interest, for example for the purpose of studying metabolic processes in cells or for analyzing the effect of pharmaceuticals on cell physiology. Particular significance is being given to fluorescence microscopy, as it allows sub-cellular optical observation of various organelles with a high level of differentiability and the microscope is developing from being purely an imaging system to an important measuring tool. However, the study of live cells places high demands on the microscope system. On the one hand, the data acquisition has to take place very rapidly in order to be able to follow the time sequence of biological processes; on the other hand the life of the cell is to be preserved or disturbance of its metabolism minimized. This requires the lowest possible light input into the cell during excitation of the fluorescing molecules, which should not however impair the signal-to-noise ratio (SNR), so that the desired information can be acquired as rapidly and accurately as possible.

Meeting these somewhat conflicting requirements is a significant challenge in the development of laser scanning microscopy.

The difficulties lie in the fact that confocal imaging is limited in its image capture rate due to its point-wise sequential data acquisition. Although the image capture rate can be increased by more rapid scanning by means of resonant galvanometer scanners, the accumulation time for each image sensor is thereby correspondingly reduced. In order, however, to achieve the desired signal-to-noise ratio, more intensive illumination is required, which in turn increases the toxic load on the live sample.

Another possibility for increasing the rate of acquiring confocal images has been created with so-called spinning disk microscopy (SDM). Here, by means of two coupled rotating disks, the first of which bears microlenses and, on the second, confocal diaphragms are arranged allocated to the microlenses, a significant increase in the image capture rate is achieved by parallelization. However, the level of the image capture rate is limited by the properties of the image sensors. Moreover, spinning disk microscopes are specialized in the functionality of the imaging; measurement tasks that go beyond this, such as fluorescence-lifetime imaging microscopy (FLIM), Förster resonance energy transfer experiments (FRET) or fluorescence correlation spectroscopy (FCS) cannot be used, or cannot be used adequately.

Finally, spectral imaging is also indispensable in order to be able to cleanly differentiate between multiple colourings of the sample and to be able to analyze switching processes in the cell. Although spectral imaging by means of spinning disk microscopy or by means of wide-field microscopes has frequently been discussed in the literature, it has not been possible for it to become established commercially until now.

As a result, individual laser-scanning microscope systems, each specializing in particular applications, are available according to the state of the art but no functionally integrated systems that satisfy more comprehensive, more universal requirements, and thereby allow for more varied applications.

A device combination proposed for confocal to wide-field microscopy is for example the confocal laser scanning microscope C2 manufactured by Nikon, which is modularly constructed from various optical components which, depending on application, can be exchanged for each other and coupled to each other.

The problem to be solved however still consists of the confocal, line or wide-field operating mode still being available during the observation of a sample, without first having to carry out the time-consuming exchange of modules or device modifications.

On this basis the object of the invention is to provide a laser scanning microscope which has various preselectable operating modalities that make it possible to configure the microscope in a simple manner, according to the respective experimental requirements.

DESCRIPTION OF THE INVENTION

This object is achieved with a laser scanning microscope of the type named at the beginning which comprises:
- a laser light source, an illumination and detection beam path, a detection device and at least one objective, each designed for use for each of the selectable operating modes, wherein
- the illumination and detection beam path comprises optical means for the configuration of the laser illumination, at least one scanner for scanning the sample with the laser illumination, and a beam splitter for separating illumination and detection light, and
- in the detection beam path controllable optical elements are provided for changing the beam guiding depending on the operating mode selected in each case.

The controllable optical assemblies are connected to a control circuit via a command input device which is designed for switching from the current operating mode to another desired operating mode, and hard- and software is present for generating images of the sample from the electronic image signals emitted by the detection device.

The term laser illumination within the meaning of the invention includes point, line and also field illumination of the sample or of an area of the sample to be examined. The point, line or field configuration of the illumination light takes place by means of the controllable optical elements depending on the operating mode predetermined in each case.

A laser scanning microscope according to the invention equipped with the previously-described features makes it possible, by avoiding the modular construction in a simple manner by switching to the individual operating modes, to obtain overview images of the sample area to be examined, rapidly and without damaging the sample,
to produce confocal image captures with spectral imaging, at image capture rates of up to 30 fps or with a high signal-to-noise ratio with minimal load on the sample,
to generate super-rapid image captures with spectral imaging, at image capture rates greater than 100 fps, or
to capture parallel 2-dimensional images of a desired region in the sample.

The above-named image capture rates of up to 30 fps or greater than 100 fps in each case relate to 512 lines per image, assuming that the image capture rate is limited due to the line speed. The image capture rate in the production of parallel 2-dimensional images is initially determined by the specific geometry of the image sensor, however a larger area of the sample can also be captured by a mosaic method.

The change of the beam guiding depending on the operating mode selected in each case is provided by coupling the detection beam into different detection paths by means of a controllable optical switching element. The detection paths differ by optical assemblies situated in the beam path and/or by the position of at least one image plane and one pupil plane. In each case one detection path is permanently allocated to one operating mode.

In a first detection path, the transmission and the influencing of the detection radiation is provided through at least one optical assembly arranged fixed in the beam path, while in a second detection path the rerouting of the detection radiation around this optical assembly is provided, in order to avoid influencing. An image plane is thereby formed at a defined position in the first detection path; a pupil plane is formed instead of the image plane in the second detection path. A lens array is for example provided as a fixed optical assembly.

The first detection path is preferably allocated to the confocal operating mode, the second detection path to the line and wide-field operating mode.

In the further course of the detection beam path, a second optical switching element can be present, with which—depending on switch position—the detection radiation coming via the respective detection path is coupled into the common detection device. A switching mirror is for example present as first switching element; a movable prism can be provided as second switching element.

The optical switching elements are connected to the control circuit which predetermines the switch positions depending on the respective operating mode. The control circuit is coupled to the command input device for switching the operating modes.

The illumination beam path of the laser scanning microscope according to the invention has an illumination scanner for moving the laser illumination over the objective pupil and/or for adjusting the illumination beam guiding to the operating mode set in each case. The movement pattern or the movement sequence depends on the operating mode selected in each case, i.e. the actuation of the illumination scanner takes place depending on the operating mode. In addition, in the illumination beam path controllable optical assemblies are also provided for varying the beam guiding depending on the operating mode selected in each case, and connected to the control circuit.

In preferred embodiments of the laser scanning microscope according to the invention, during the confocal operating mode a lens assembly is swivelled into the illumination beam path,
during the line operating mode the lens assembly and a cylinder lens are swivelled in, and
during the wide-field operating mode, instead of the lens assembly and the cylinder lens, a telescope is swivelled in.

The function and purpose of the swivellable assemblies are explained in more detail below with reference to embodiment examples. The swivelling in and out is brought about by the control circuit depending on the predetermined operating mode.

In addition, it is conceivable and lies within the scope of the invention, to carry out the beam shaping for the individual operating modes by manipulating the phase of the laser beam in a plane conjugate with the objective pupil by means of a spatial light modulator (SLM).

In a particularly preferred embodiment the detection device common to all the operating modes has an optoelectronic image sensor, the sensor pixels of which are individually controllable for the purpose of activation and deactivation. The control of the image sensor or of the individual sensor pixels is brought about by the control circuit depending on the predetermined operating mode.

The image sensor has a two-dimensional arrangement of the sensor pixels, with the result that in accordance with spinning disk technology it is possible, without damaging the sample, to acquire rapid confocal images with a plurality of spots by parallelization of excitation and detection. In an advantageous embodiment, each sensor pixel can be individually activated or deactivated by means of the control circuit, several sensor pixels can be variably combined in groups and a plurality of pixel regions on the sensor surface to be read independently of each other are freely programmable.

In the case of the wide-field scanning operating mode, each pixel of the two-dimensional sensor matrix registers the intensity of the emission allocated to one sample location. The read data from the sensor thus result in a monochrome partial image. In the confocal and line-illuminating operating modes, the intensity emitted from the allocated sample location within a defined spectral band can be learned from each sensor pixel via an additional lens system arrangement. The spectral information here lies essentially orthogonal to the location information distributed over the sensor surface. Spectral imaging is thus made possible in these operating modes.

On this basis, a matrix of avalanche photodiodes preferably comes into consideration as image sensor. However, in addition for example, hybrid detectors or matrix arrangements of photomultipliers are also suitable as image sensors.

The advantage of an avalanche photodiode array over a photomultiplier arrangement is smaller sensitive elements, making camera-type operation possible,
more elements possible on a specific surface area,
a fill factor of up to 100% can be achieved via rear lighting.

In this respect the concept of the invention consists, among other things, of the realization of a multifocal imaging, a line imaging, as well as a wide-field imaging with one and the same image sensor. It is possible to switch between these modes simply and rapidly, in that a few variable optical assemblies are actuated and the image sensor is also adjusted by direct reprogramming.

The laser scanning microscope according to the invention is preferably designed for fluorescence microscopy with the illumination light as excitation radiation and the fluorescence caused thereby as detection radiation.

BRIEF DESCRIPTION OF THE DRAWINGS

The invention is explained in more detail below by way of example with reference to drawings. There are shown in:

FIG. 1 a schematic diagram of the laser scanning microscope according to the invention, FIG. 2 an example of the configuration of the illumination and detection beam path for the multiconfocal microscopy operating mode, FIG. 3 an example of the configuration of the illumination and detection beam path for the wide-field microscopy operating mode, FIG. 4 an example of the configuration of the illumination and detection beam path for the line-scanning microscopy operating mode, FIG. 5 a further example of the embodiment of the detection beam path in the above-named area relating to the multiconfocal microscopy operating mode, FIG. 6 an example of the embodiment of the detection beam path in the above-named area relating to the line-scanning microscopy operating mode.

DETAILED DESCRIPTION OF THE DRAWINGS

Figure 1:
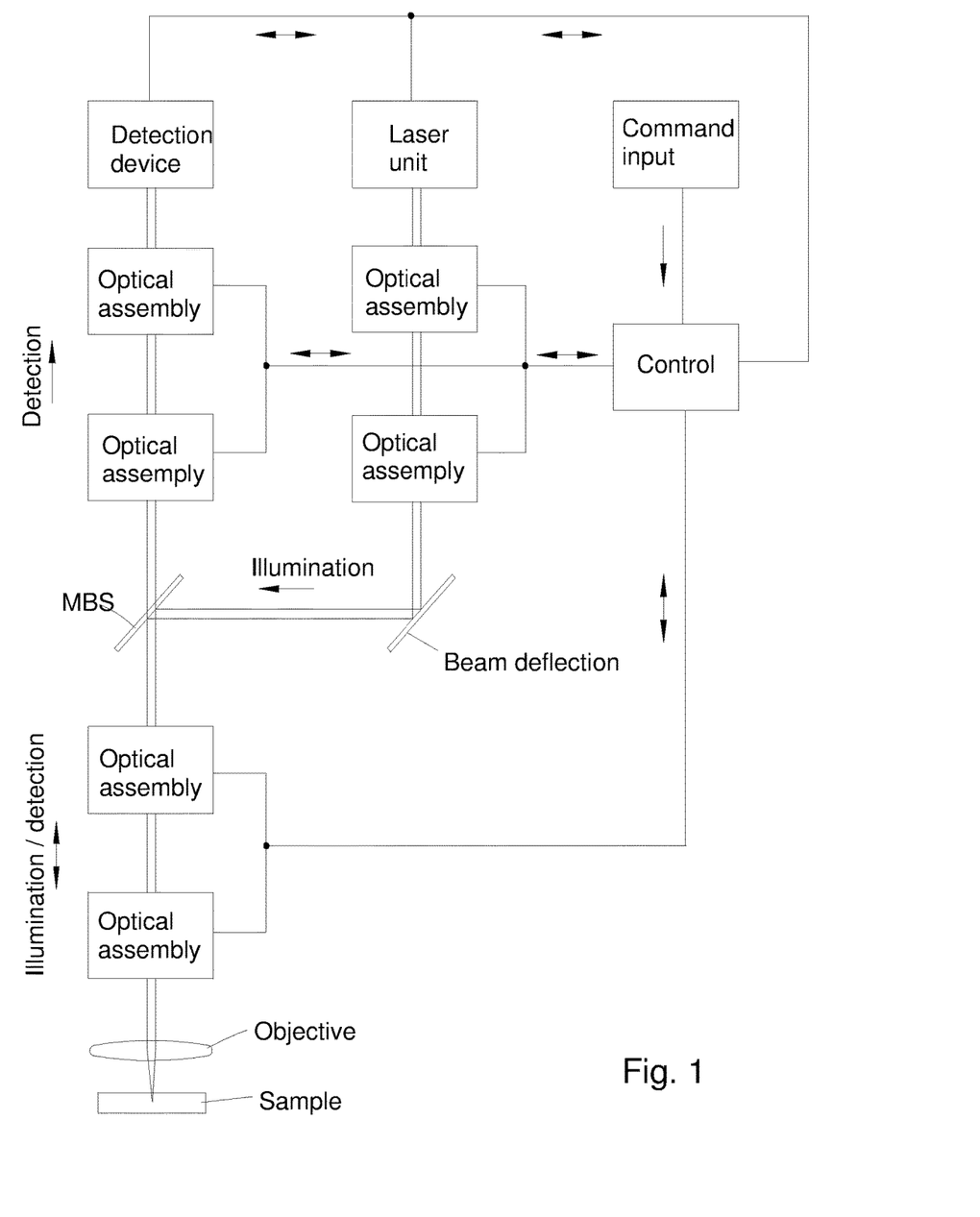

The representation shown in FIG. 1 illustrates the basic structure of the laser scanning microscope according to the invention, for example designed for fluorescence microscopy.

A laser unit and a detection device are provided which are programmable with respect to the confocal, line or wide-field operating modes, i.e. an exchange of different laser units and/or detection devices is no longer required when the operating modes are changed.

Figure 2:
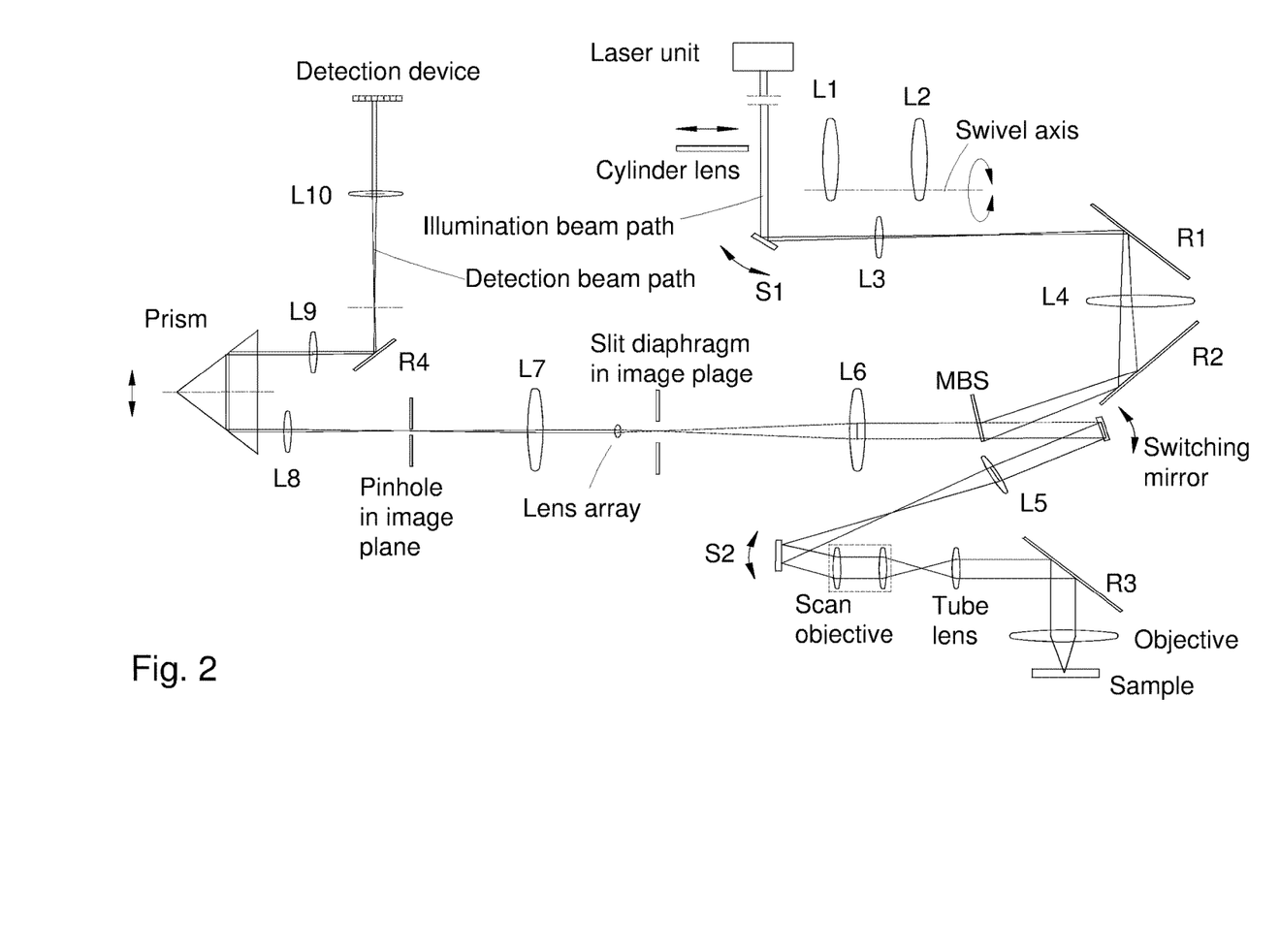
Figure 3:
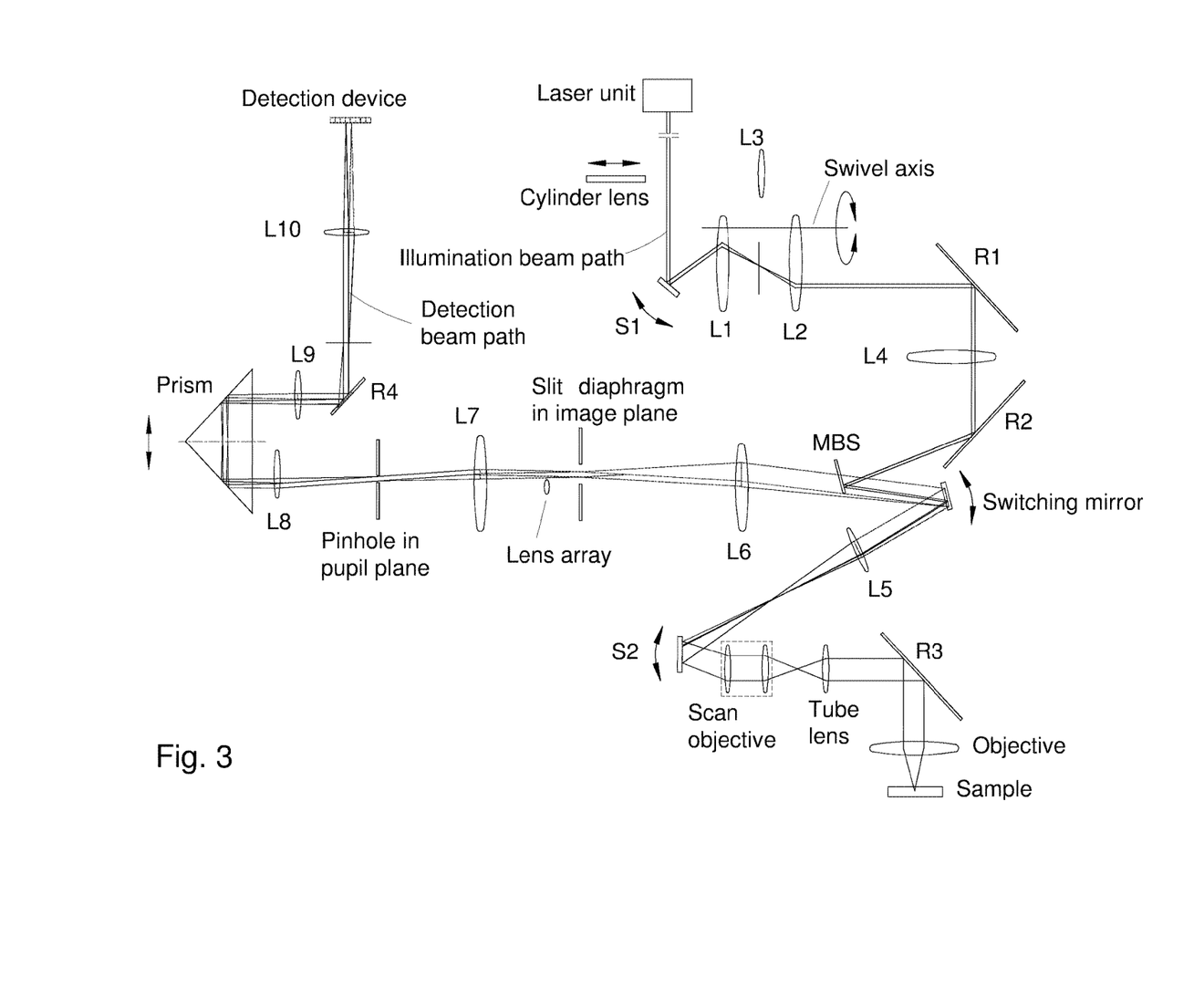
Figure 4:
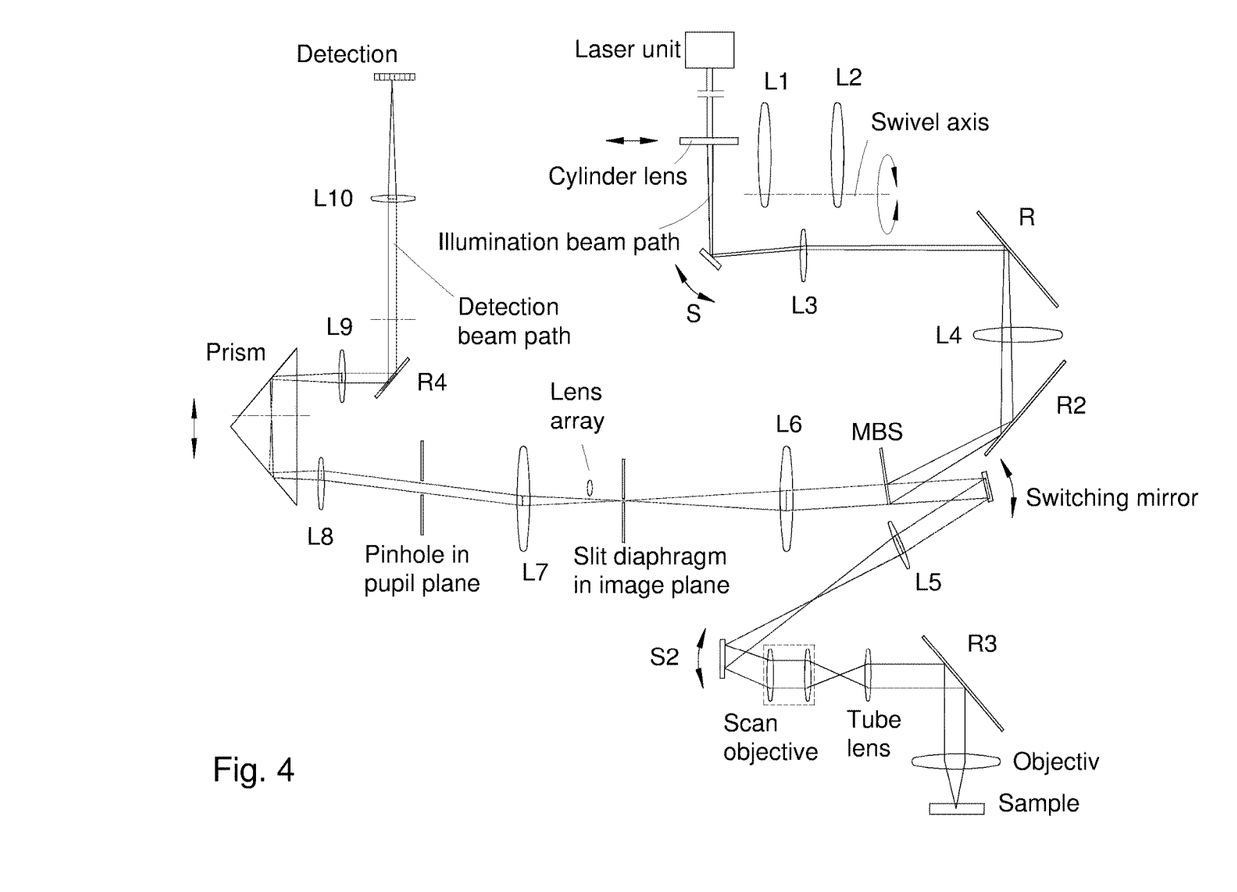

Essentially, when the operating modes are changed, the illumination and detection beam path also remain unchanged, only there are present in the beam paths some variably controllable optical assemblies which are designed for adjusting the beam guiding (cf. FIG. 2 to FIG. 4). The controllable optical assemblies per se, the basic optical elements of the microscope system such as main beam splitters MBS and beam deflectors and also the objective remain, independent of the selected operating mode, fixed in their positions. For positioning purposes, as known from the state of the art, the sample is movable relative to the objective within the coordinates x, y, z by means of a preferably motorized sample table.

A command input device which serves for the manual pre-setting of the respective desired operating mode, is connected to the control circuit.

FIG. 2 shows the beam path for the illumination and detection in the imaging mode in the case of confocal or multiconfocal microscopy, which makes possible frame rates of approx. 30 fps in the case of optimum spectral functionality.

A swivellable cylinder lens (alternately also a Powell lens), an illumination scanner S1 and an interchangeable lens system housed rotatable via a swivel axis, with an individual lens L3 and a telescope consisting of the lenses L1, L2 are provided as controllable optical assemblies in the illumination beam path up to the main beam splitter MBS.

In the case of the confocal or multiconfocal lens scan described here by way of example, the individual lens L3 is swivelled into the illumination beam path. The illumination light reflected on the main beam splitter MBS is deflected in the direction of the objective with the switching mirror and the system scanner S2 which both lie in planes conjugate with the pupil of the objective. In the multiconfocal operating mode a plurality of laser beams which are spread out in the form of a fan in fixed angular relationship to each other, are coupled into the system. This fan is aligned perpendicular to the plane of drawing of FIG. 2, i.e. the plurality of laser beams lie one behind the other in the plane of drawing. The angular relationship of the beams to each other is adjusted to the pitch of the lens array. The illumination scanner S1 is positioned so that the bundle of rays is guided along the axis of the subsequent lens systems.

The lens system consisting of L3 and L4 images the illumination scanner S1 onto the switching mirror, while L5 images the switching mirror onto the system scanner S2. The illumination scanner S1 and the switching mirror thus lie conjugate with the objective pupil.

Thus pupils in which all the excitation beams overlap, each lie respectively on the illumination scanner S1, the switching mirror, the system scanner S2 and in the objective. Each partial beam thus produces a spot in the object space, wherein the spots are arranged along a line. The spot pattern is moved over the sample by means of the system scanner S2. The number of spots is set via an activation or dimming of partial beams. Means for producing the plurality of partial beams are known from the state of the art and require no more detailed explanation here.

The separation of illumination and detection light takes place on the main beam splitter MBS, which can for example be made as a notch filter.

Along the detection beam path, a switching mirror and a lens L6 are arranged, which produce an image plane in which a slit diaphragm (variable by actuation with respect to the other two operating modes) is located. The image plane of the lens L6 in addition lies in the scanner-side focal plane of a subsequent lens array and a pinhole lens system with a pinhole (variable by actuation with respect to the other two operating modes). The pinhole is arranged in the sensor-side image plane of the lens L7. Downstream of the pinhole is a lens system consisting of L8 to L10, which images the emission onto a detection device. Depending on the set operating mode, a displaceable prism optimizes the position of the emission from the sample on the sensor matrix.

The emission from the positions of the laser illumination in the object space is de-scanned by means of the system scanner S2 and aligned with the switching mirror along the optical axis of the pinhole lens system. In particular the combination of switching mirror and main beam splitter MBS is set so that each partial beam is collimated through a lens allocated thereto in the lens array. As the partial beams are telecentrically guided around the intermediate image in the position of the slit diaphragm upstream of the lens array, a transformation to parallel beam guiding takes place through the lens array. The partial beams are then imaged through the pinhole onto the image sensor of the detection device. The detection device is preferably equipped with an avalanche photodiode array as image sensor.

Both in the confocal operating mode and in the other two operating modes, at the position of the slit diaphragm an image plane is always located, which at the same time also lies in the focal plane of the lens array and also in the focal plane of the lens L7.

The confocal operating mode shown in FIG. 2 corresponds in principle to the basic mode of the functionally integrated laser scanning microscope according to the invention. In this mode, as can be seen in FIG. 2, the detection radiation is guided through the lens array. Laser spots lying on the respective optical axes of the lens array are collimated as partial beams by means of the lens array and guided further telecentrically up to the lens L7 which focuses the telecentric, collimated partial beams on a common point in the pinhole plane. Therefore, only this one pinhole is required in order to confocally filter all the partial beams; the aperture of the pinhole is reduced to the desired size, in this operating mode for example to an opening diameter which corresponds to one Airy unit.

In the other two operating modes, in which a semiconfocal or field-scanning imaging is carried out by means of linear or flat excitation respectively, the lens array would cause disturbance in the beam path because it strongly segments the image field. Therefore, in these cases the detection radiation is directed into a separate detection path with the switching mirror and thus guided past the lens array.

Thus, while in the confocal operating mode the lens L7 images all the partial beams onto the optical axis in the pinhole plane, the pinhole plane, as rear focal plane of the lens L7, is conjugate with the objective pupil in the other two operating modes, i.e. in the field or line configuration (cf. explanations relating to FIG. 3 and FIG. 4).

The lens system consisting of L8 and L9 is a relay system which images the pinhole plane into the interface to the detector lens system. The lens L10 represents the detector lens system.

This results in the following advantageous properties of the arrangement which support the ability according to the invention, to switch between all the selectable operating modes:

small apertures at the lens array,
large apertures at the lens L7,
the slit diaphragm at an image plane,
the scanner-side focal planes of lens array and lens L7 lie together in the position of the slit diaphragm,
the slit diaphragm is to be controllably opened around the slit to the extent that the sub-field can be transferred,
the pinhole can be controlled so that it can be opened at least to the pupil boundary present in the pinhole plane.

As an embodiment variant differing from the description, the mirroring of the illumination beams into the detection beam path can take place between the lens array and the pinhole lens system. The partial beams are then already to be guided parallel in the illumination beam path.

By reducing the number of partial beams, instead of the multifocal imaging, monofocal operation can of course also be carried out, as known from the state of the art of laser scanning microscopy.

FIG. 3 shows an example of the configuration of the illumination and detection beam path in the wide-field or field-scanning microscopy operating mode.

In the case shown here, the telescope consisting of the lenses L1, L2 instead of the individual lens L3 is swivelled into the illumination beam path. The illumination light reflected by the main beam splitter MBS is in turn deflected with the switching mirror and the system scanner S2 in the direction of the objective, wherein however a laser focus occurs on both, which is moved over the pupil plane with the most rapid possible scanning movement of the illumination scanner S1.

The fluorescence thus excited in the whole field of the objective completely illuminates the objective pupil on the return path from the sample. The objective pupil is imaged into the conjugate planes on the system scanner S2 and the switching mirror. In the case of the field scan shown, the switching mirror is set by actuating so that the transferrable field, transmitted by the main beam splitter MBS, is directed extra-axially past the lens array on a separate detection path.

Both the variable pinhole arranged in the detection beam path and the variable slit diaphragm in front of the lens array are wide open in the operating mode shown here.

The system scanner S2, by means of an offset angle set by actuation determines the position of the imaged sub-field in the available object field of the microscope objective. Optionally, another field diaphragm (not shown) can also be moved in the first intermediate image plane behind the objective together with the scanner offset, in order to prevent or minimize an overexposure of sample areas outside the detectable object field.

Alternatively, at this point an illumination zoom lens can be provided, in order to limit the numerical aperture (NA) of the illumination and thus to control the size of the illuminated object field. An adjustment of the NA can however also be provided in the interchangeable lens system, and be designed so that the transferrable field is completely illuminated.

FIG. 4 shows the beam path for the line-scanning mode. In this case the cylinder lens is positioned in the illumination beam path, with the result that a linear light distribution occurs on the illumination scanner S1, wherein the illumination scanner S1 lies in the focal plane of the cylinder lens. The interchangeable lens system is situated so that the individual lens L3 is located in the illumination beam path. Thus a pupil plane lies in turn on the illumination scanner S1, the switching mirror, the system scanner S2 and in the objective. The objective then produces a line focus in the object space which, with the system scanner S2 is scanned perpendicular to the line direction and positioned by means of offset angles.

The emission from the line focus is de-scanned through the system scanner S2 and directed past the lens array with a corresponding position of the switching mirror. The slit diaphragm in the intermediate image in front of the lens array is pulled to the desired width in order to achieve a semiconfocal detection. The downstream pinhole is opened to its maximum. The displaceable prism pulls the centre of the line distribution onto the axis of the image sensor of the detection lens system. In the case of the line-scanning mode, the image sensor lies in an image plane conjugate with the slit.

In the embodiment variants which also lie within the scope of the inventive concept, differing from the above description with reference to FIG. 2 to FIG. 4, the preferred position of the displaceable prism, depending on the operating mode, is not that which directs the centre of the transferred field onto the axis of the subsequent lens system, but that position which allows the image sensor to be used most efficiently for the operating mode selected in each case. Specifically this means that a. in the case of the field scan, the transferrable field is imaged onto the image sensor symmetrically to the centre of the image sensor,
b. in the case of the line scan, the linear emission distribution is spectrally dispersed with a prism or grating perpendicular to the linear alignment and the spectrally split image of the line is imaged onto the image sensor symmetrically to the centre of the sensor or, beginning with a selected start wavelength, at the sensor edge,
c. in the case of the multifocal scan, the individual partial beams are guided through a further lens array, while the subsequent spectral imaging of the emission distribution then takes place analogously to the description of the line scan.

The switching of the detection beam path necessary for b) and c) can for example take place through the displaceable prism. This is shown schematically in FIG. 5 and FIG. 6.

Figure 5:
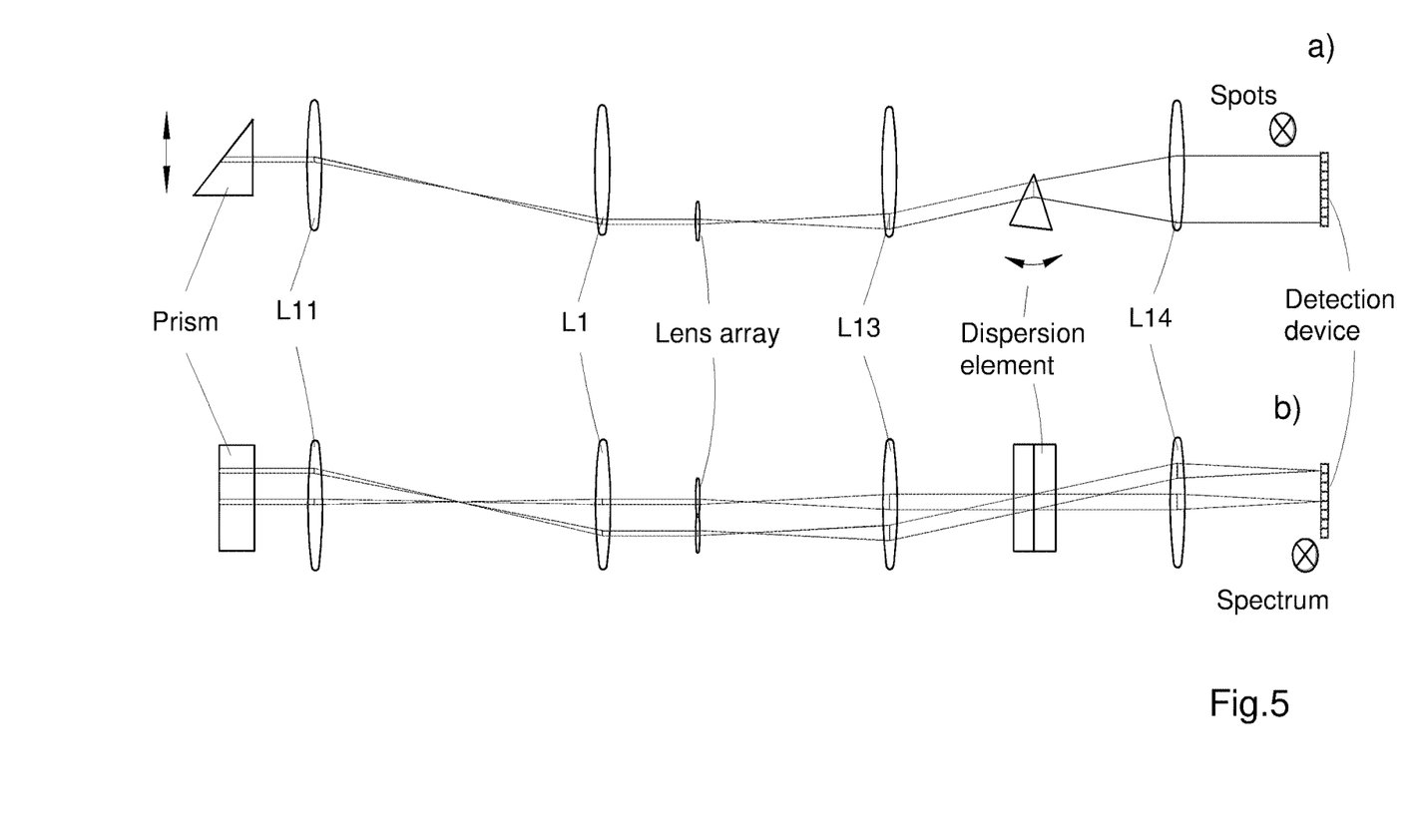

FIG. 5 shows in more detail the optical path from the displaceable prism up to the sensor plane for the multifocal operation with reference to an example. FIG. 5a) shows a top view, while FIG. 5b) shows a side view of the detection beam path. Downstream of the displaceable prism there are two relay lens systems consisting of the lens pairs L11/L12 and L13/14, which image the emission into the sensor plane. Between the two relay lens systems there is a lens array which is in turn arranged fixed.

In the case of the multifocal operation shown here, the displaceable prism is set so that the emission is guided through the lens array. Thus the partial beams are imaged into the focal plane of the subsequent relay lens system. Between the lenses L13 and L14 the partial beams are now collimated and guided in fixed angular relationship to each other. In the common focal plane of L13 and L14 there is a dispersing element, for example a prism, which breaks down the emission guided in the partial beams into its spectral components. Advantageously, the dispersion direction lies perpendicular to the fan spread through the partial beams. Lens L14 images the spectrally dispersed emission onto the sensor. Spots and spectrum are advantageously arranged perpendicular to each other.

The sensor now lies, independently of the selected operating mode, in a plane conjugate with the sample. By contrast, with the other two operating modes, namely line- and field-scanning, the detection radiation would be guided past this lens array.

Figure 6:
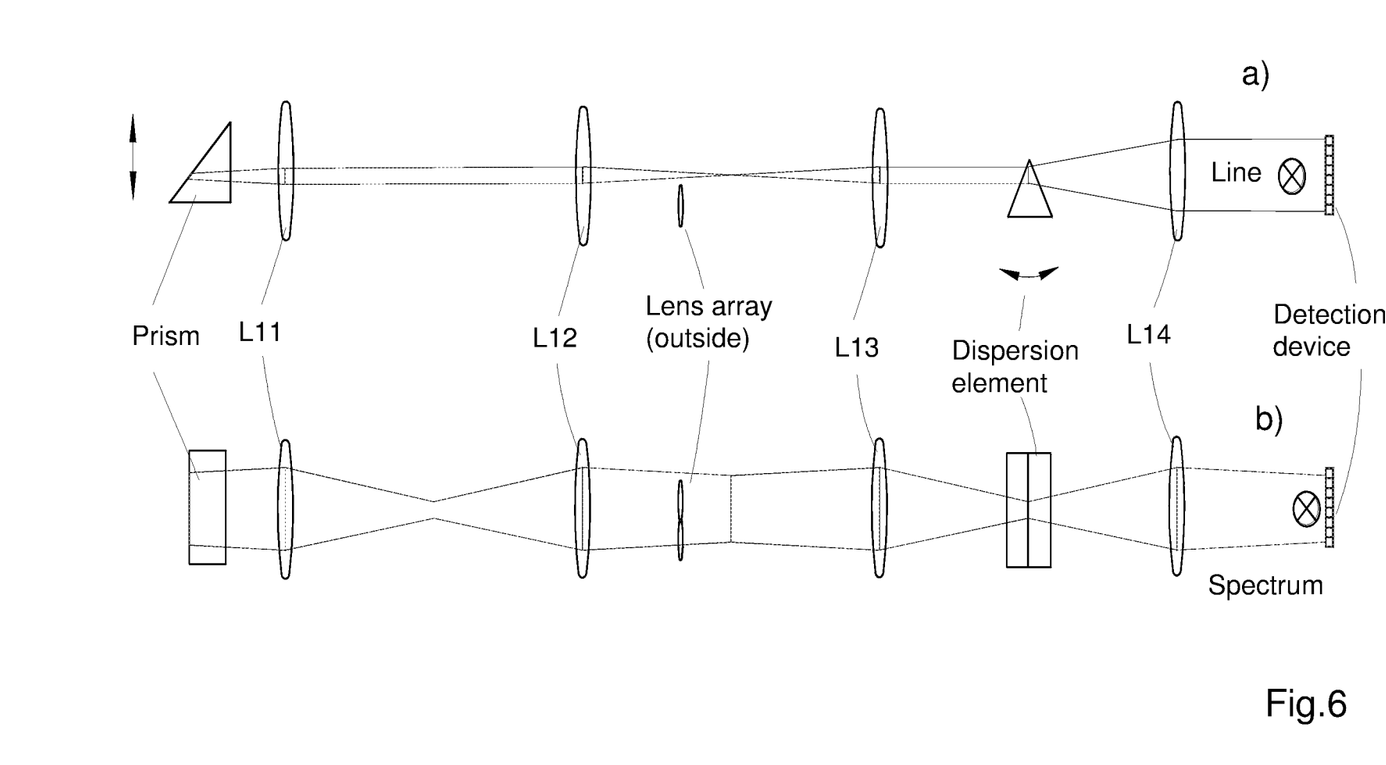

In the line-scanning operating mode, the displaceable prism, as shown in FIG. 6, is set so that the emission is guided past the lens array. The spectral constituents on the image sensor are produced with the same dispersion element for the multiconfocal operating mode (FIG. 5) and the line-scanning operating mode (FIG. 6). The position of the spectrum on the sensor matrix is, if necessary, achieved by a rotation of the dispersion lens system, as shown by FIG. 5, with respect to the multiconfocal mode and by FIG. 6 with respect to the line-scanning mode. For the field-scanning mode, the dispersion element is removed from the beam path.

The switching between pupil and field can in principle take place with swivellable Bertrand lenses or by means of switchable light paths. Elements suitable for switching are, as already specified, mirrors for the angle separation (preferably MEMS), plane plates for the lateral separation or prisms for both.

The invention claimed is:

1. A functionally integrated laser scanning microscope, for scanning a sample with laser illumination, selectably in a confocal, line or wide-field operating mode and having at least two of the selectable operating modes, the microscope comprising a laser light source, an illumination and detection beam path, a detection device and at least one objective, wherein the illumination and detection beam path comprises optical means for the configuration of the laser illumination, at least one scanner for scanning the sample with the laser illumination, and a beam splitter for separating illumination and detection light, wherein the detection beam path for each of the selectable operating modes ends at the same image sensor of the detection device, in the detection beam path a controllable optical switching element is provided for changing the beam guiding by coupling the detection radiation into different detection paths depending on the operating mode selected in each case, wherein in each case one detection path is permanently allocated to one operating mode, wherein in a first detection path, the transmission and influencing of the detection radiation is through at least one optical assembly arranged in the beam path and in a second detection path the detection radiation is rerouted around the at least one optical assembly, and wherein an image plane is formed at a defined position in the first detection path, and a pupil plane is formed at the position of the image plane in the second detection path.

2. The functionally integrated laser scanning microscope according to claim 1, further comprising a control circuit for the controllable optical assemblies, a command input device for bringing about the switching from the current operating mode to another selectable operating mode, and hardware and software for generating images of the sample from the electronic image signals emitted by the detection device.

3. The functionally integrated laser scanning microscope according to claim 1, in which the fixed optical assembly is a lens array.

4. The functionally integrated laser scanning microscope according to claim 1, in which the first detection path is allocated to the confocal operating mode, and the second detection path to the line or the wide-field operating mode.

5. The functionally integrated laser scanning microscope according to claim 1, further comprising a second controllable optical switching element in the detection beam path for the defined coupling of the detection radiation transferred over the allocated detection path in the respective operating mode, into the detection device.

6. The functionally integrated laser scanning microscope according to claim 1 in which, in the illumination beam path controllable optical assemblies are provided for varying the beam guiding depending on the respective operating mode selected and connected to the control circuit.

7. The functionally integrated laser scanning microscope according to claim 6 in which, in the illumination beam path an illumination scanner is provided for moving the laser illumination over the objective pupil, wherein the movement is predetermined depending on the operating mode selected in each case, during the confocal operating mode a lens assembly is swivelled into the illumination beam path, during the line operating mode the lens assembly and a cylinder lens are swivelled into the illumination beam path, and during the wide-field operating mode, a telescope is swivelled into the illumination beam path.

8. The functionally integrated laser scanning microscope according to claim 1, further comprising an optoelectronic image sensor, the sensor pixels of which are individually controllable for the purpose of activation and deactivation, preferably in the form of an array of avalanche photodiodes, and a circuit for actuating the individual sensor pixels depending on the operating mode selected in each case.

9. The functionally integrated laser scanning microscope according to claim 1, in which switching mirrors or movable prisms are provided as optical switching elements.

10. The functionally integrated laser scanning microscope according to claim 1 adapted for fluorescence microscopy with the illumination light as excitation radiation and the fluorescence caused thereby as detection radiation.

* * * * *